April 21, 1953

W. J. HAHN 2,635,353

DRUM DRIER

Filed Aug. 19, 1948

INVENTOR
WILLARD J. HAHN

BY
Bartlett Eyre Keel & Weymouth
ATTORNEYS

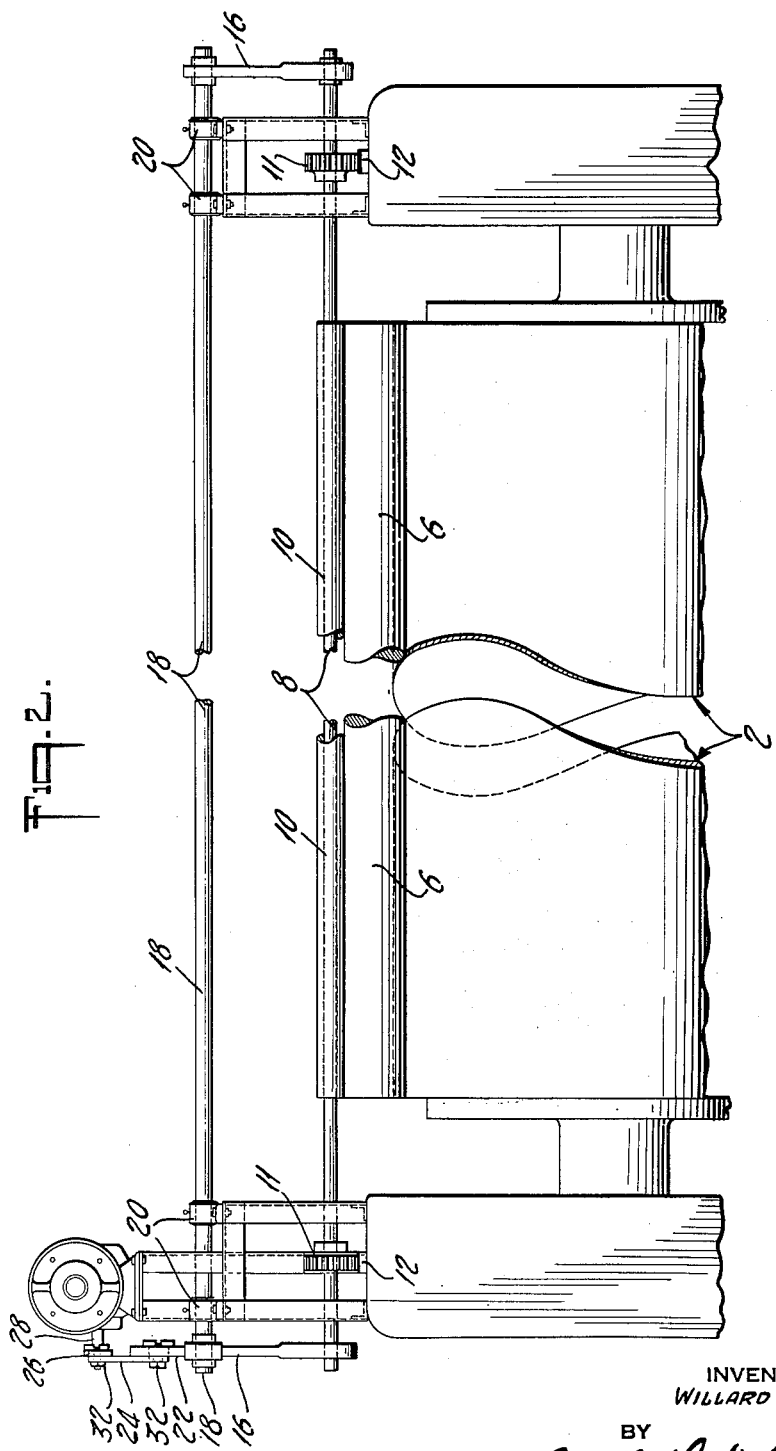

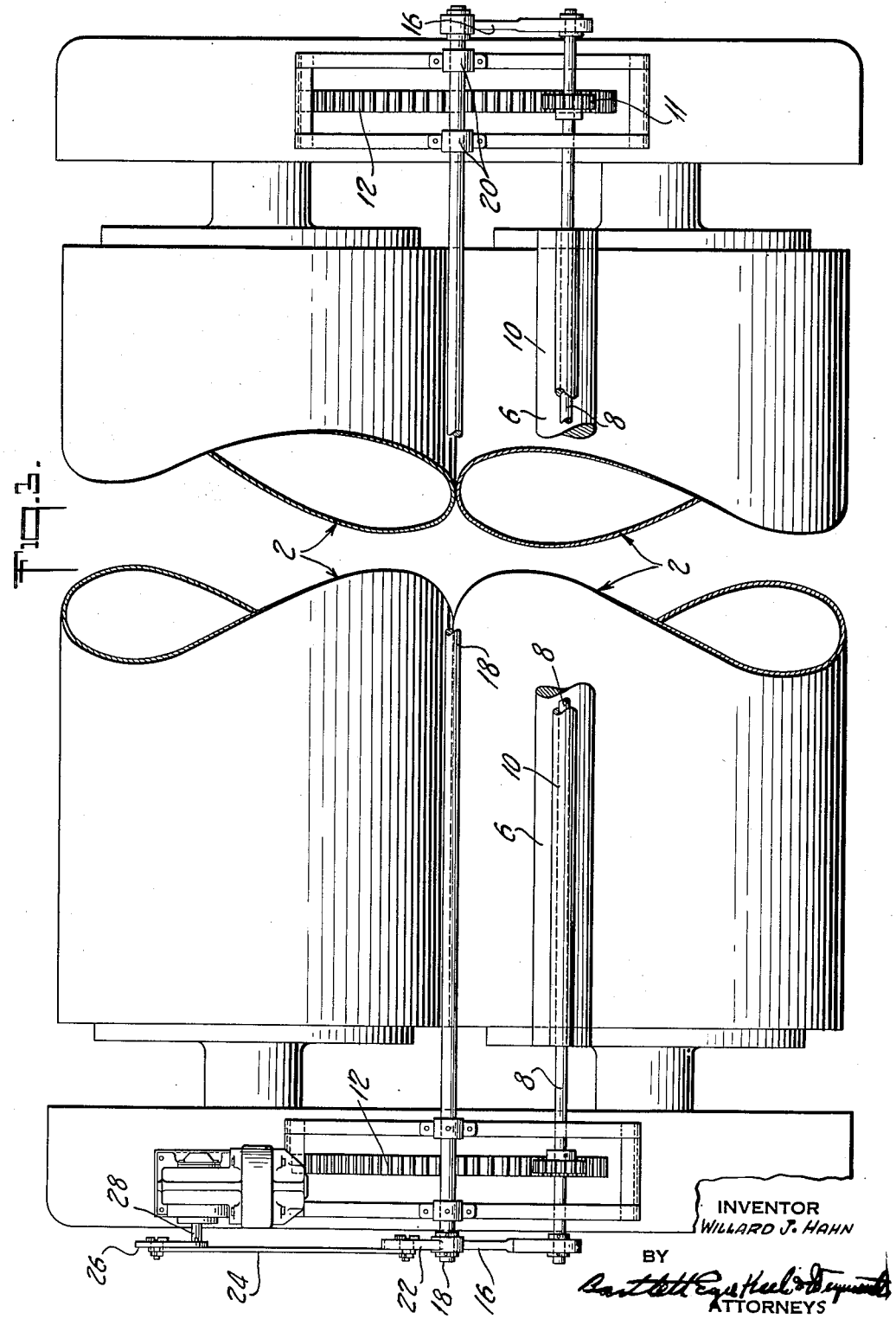

Patented Apr. 21, 1953

2,635,353

UNITED STATES PATENT OFFICE 2,635,353

DRUM DRIER

Willard J. Hahn, East Rochester, N. Y., assignor to Beech-Nut Packing Company, Canajoharie, N. Y., a corporation of New York Application August 19, 1948, Serial No. 45,020

6 Claims. (Cl. 34—112)

The present invention relates to drum driers, and has special reference to double drum driers that are particularly adapted for drying heavy viscous material such as cooked cereals for use in making cereal flakes.

One of the objects of the invention is to provide a drier of this character in which means is provided that effectively eliminates stratification or separation of material between the drier rolls due to partial concentration; insures uniform distribution of heavy viscous material to all points on the drier rolls, thus eliminating spotty pickup usually due to large air pockets; increases the thickness of the material doctored from the drier rolls; and agitates the material in such a manner as to facilitate evaporation.

The several features of the invention, whereby this and other objects may be attained, will be readily understood from the following description and accompanying drawings, in which:

Fig. 2 is a side view with certain parts broken away to save space;

Fig. 3 is a corresponding plan view.

Figure 1:
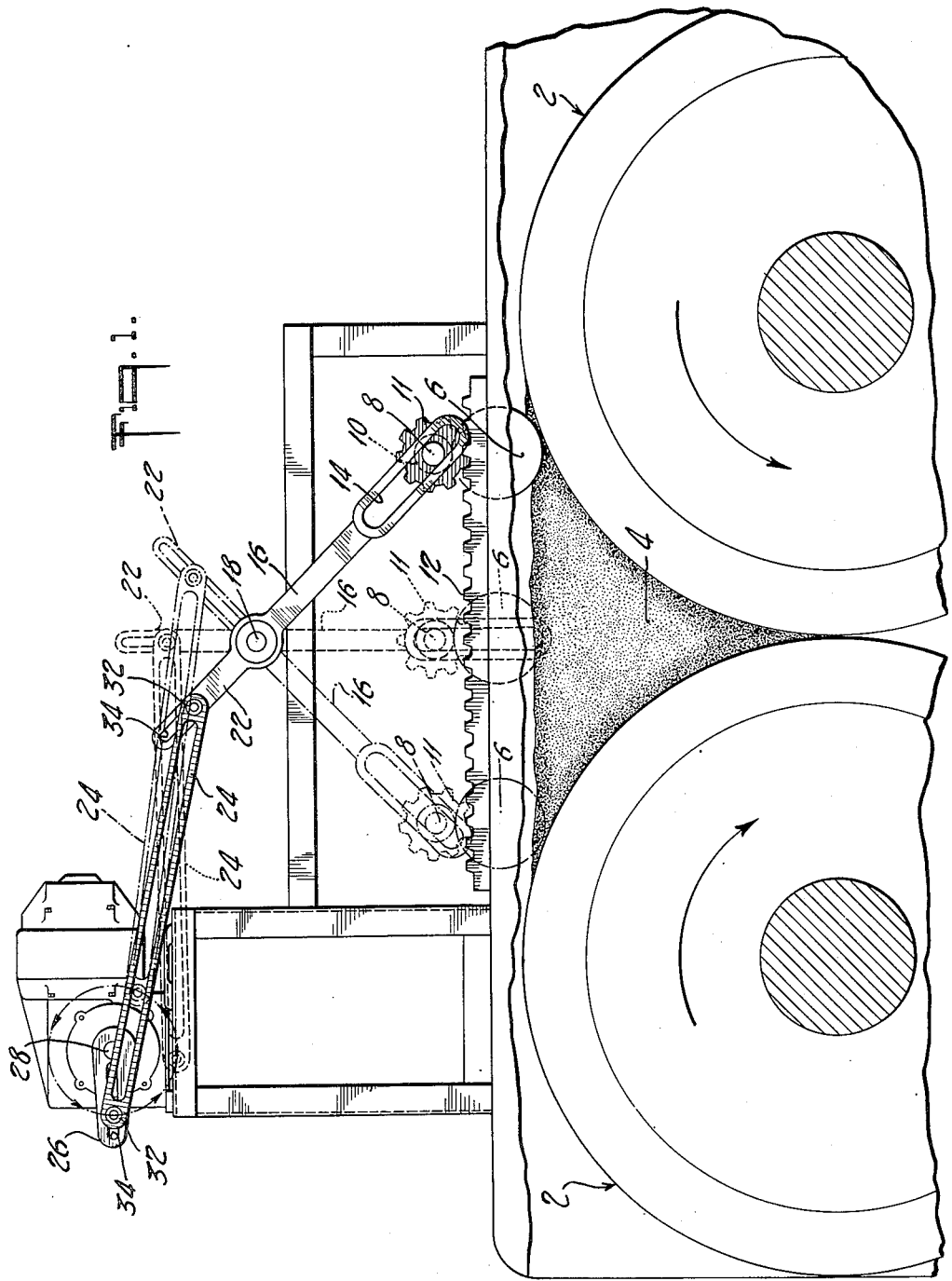
Figure 1 is a front view, partly in section, of a portion of a double drum drier embodying the features of the invention in their preferred form, certain parts being shown in different positions by broken lines.

The drier illustrated in the drawings is provided with the usual drier drums or rolls 2 which are rotated in opposite directions with the opposed or adjacent surfaces of the rolls moving downward. The cooked cereal 4, or other material to be dried may be supplied to the valley between the rolls by any conventional means.

In accordance with the present invention, a cylindrical pressure bar 6 arranged parallel with the axes of the rolls is suspended from a shaft 8, the pressure bar being welded or otherwise secured to a tubular bearing 10 through which the shaft 8 loosely extends. Pinions 11 are secured on the ends of the shaft 8 and ride upon pinion racks 12. The ends of the shaft 8 are received in elongated slots 14 in arms 16 which are secured on the ends of a rock-shaft 18 mounted to turn in bearings 20 on the machine frame.

One of the arms 16 is provided with an extension 22 which is connected through a link 24 with a crank arm 26 that is driven by a motor driven shaft 28.

Upon rotation of the crank 26, the link 24, and arm extension 22 act through the shaft 8 to reciprocate the pressure bar 6 between the surfaces of the drums or rolls 2, the pinions 11 by riding on the racks 12 serving to guide the pressure bar during the reciprocation thereof.

The amount of clearance between the pressure bar 6 and the drier rolls 2 at the limits of the strokes of the bar may correspond with the clearance between the drier rolls. This clearance, however, may be varied to meet different conditions by varying the length of the stroke of the bar. To provide for this, the ends of the link 24 are connected to the arm extension 22 and the crank 26 by means of adjusting bolts 32 which extend through elongated slots 34 in said extension and crank arm.

The lower portion of the suspended pressure bar extends a distance below the normal level of the material in the valley between the drier rolls. Preferably the rate of reciprocation of the pressure bar is within a range of 40 to 120 strokes per minute when the drier rolls are operated from 2 to 6 revolutions per minute.

With this construction the heavy pressure bar suspended from the shaft 8 serves to thoroughly agitate the material as it enters the valley between the drier rolls, and produces sufficient pressure on the material between it and the drier rolls as to coat the rolls before it reaches the squeeze part of the rolls. The pressure bar thus assists the drier rolls in picking up a greater percentage of the material, and insures uniform distribution, especially of heavy viscous material, to all points on the drier rolls. This results also in increasing the thickness of the material doctored from the drier rolls, and hence increases the production. The thorough agitation of the material facilitates evaporation, and stratification or separation of the materials between the drier rolls due to partial concentration is eliminated. The pivotal suspension of the bar causes it to yieldingly press the material against the surfaces of the drier rolls, and the provision for adjustment of the stroke of the bar enables the thickness of the coating to be varied as desired.

As will be evident to those skilled in the art, my invention permits various modifications without departing from the spirit thereof or the scope of the appended claims.

What I claim is:

1. In a drier of the class described, the combination of drier rolls arranged horizontally for rotation in opposite directions with the adjacent surfaces thereof moving downwardly, a cylindrical bar arranged parallel with the axes of the rolls and extending downward a distance into the material-receiving portion of the valley between the rolls, and means for reciprocating said bar between predetermined points spaced in proximity to the surfaces of the rolls.

2. In a drier of the class described, the combination of drier rolls arranged horizontally for rotation in opposite directions with the adjacent surfaces thereof moving downwardly, a bar arranged parallel with the axes of the rolls and extending downwardly into the material-receiving portion of the valley between the rolls, and means for reciprocating said bar horizontally between the rolls, said means having provision for adjustment to vary the limits of said reciprocating movement.

3. In a drier of the class described, the combination of drier rolls arranged horizontally for rotation in opposite directions with the adjacent surfaces thereof moving downwardly, a pressure bar arranged parallel with the axes of the rolls and extending downwardly into the material-receiving portion of the valley between the rolls, a rod on which said pressure bar is suspended having its axis arranged parallel with the axis of the bar, pinions on the ends of said rod, racks on which said pinions are respectively supported arranged transversely of the axes of said rod and bar, and means for reciprocating said rod horizontally to cause said pinions to be moved back and forth on said rack and to reciprocate said pressure bar between predetermined points spaced in proximity to the surfaces of said rolls.

4. In a drier of the class described the combination of drier rolls arranged horizontally for rotation in opposite directions with the adjacent surfaces thereof moving downwardly, a pressure bar arranged parallel with the axis of the rolls and extending downwardly into the material-receiving portions of the valley between the rolls and means for alternately moving said bar into tangential proximity to the surfaces of said rolls.

5. In a drum drier of the class described, the combination of drying rolls arranged horizontally for rotation in opposite directions with the adjacent surfaces thereof moving downwardly, a cylindrical bar having its axis substantially parallel with the axes of the rolls and mounted for horizontal reciprocating movement between predetermined points in proximity to the surfaces of the rolls, the lower portion of the bar extending a distance below the normal level of the material in the valley between the rolls, a rod on which said pressure bar is suspended having its axis arranged parallel with the axis of the bar, pinions on the ends of said rod, racks on which said pinions are supported arranged transversely of the axes of said rod and bar, a shaft arranged centrally above the rolls with its axis parallel with the axes of the rolls, arms respectively secured on the ends of said shaft and provided with elongated clearance slots into which the ends of said rod extend, and means for oscillating said levers to effect said reciprocating movement of said bar comprising a rotating crank and a link connecting said crank with one of said levers.

6. In a drier of the class described, the combination of drier rolls arranged horizontally for rotation in opposite directions with the adjacent surfaces thereof moving downwardly, a pressure bar arranged parallel with the axes of the rolls and extending downwardly into the material-receiving portion of the valley between the rolls, a rod from which said pressure bar is suspended having its axis arranged parallel with the axis of the bar, and means for reciprocating said rod horizontally to reciprocate said pressure bar between points spaced in proximity to the surfaces of said rolls.

WILLARD J. HAHN.

References Cited in the file of this patent

UNITED STATES PATENTS

| Number | Name | Date |
|---|---|---|
| 879,060 | Paucksch | Feb. 11, 1908 |
| 2,144,911 | Cohn | Jan. 24, 1939 |
| 2,357,868 | Beardslee | Sept. 12, 1944 |